United States Patent [19]

Prill

[11] Patent Number: 4,583,162
[45] Date of Patent: Apr. 15, 1986

[54] LOOK AHEAD MEMORY INTERFACE

[75] Inventor: Robert S. Prill, Parsippany, N.J.
[73] Assignee: The Singer Company, Little Falls, N.J.
[21] Appl. No.: 457,653
[22] Filed: Jan. 13, 1983
[51] Int. Cl.⁴ .............................................. G06F 12/00
[52] U.S. Cl. ................................................... 364/200
[58] Field of Search ... 364/200 MS File, 900 MS File

[56] References Cited

U.S. PATENT DOCUMENTS 4,223,381 9/1980 Rozell et al. ........................ 364/200
4,439,827 3/1984 Wilkes ................................. 364/200

Primary Examiner—James D. Thomas
Assistant Examiner—Emily Y. Chan
Attorney, Agent, or Firm—T. W. Kennedy

[57] ABSTRACT

A memory access system for a computer is improved by combining look ahead techniques with a partitioned memory. A parallel system operating in reciprocal fashion accesses from one portion while the other portion is generating the next predicted address. The system can also be adapted for use with virtual addressing.

1 Claim, 8 Drawing Figures

LOOK AHEAD MEMORY INTERFACE

BACKGROUND OF THE INVENTION

The subject matter of this invention lies in the field of computers and specifically techniques of high speed memory addressing.

As newer generations of computers and computer technology evolve, the focus has primarily been on improving the quantity of information processed and the speed at which such information is handled. It is obvious that the quantity can always be increased by adding more hardware. Fortunately, system designers can avail themselves of newer, more compact, and more energy efficient technologies that render such increases feasible. To increase the speed or throughput of computer apparatus, however, one has to do more than just upgrade the hardware. Oftentimes it is not simply a matter of substituting faster hardware for slower hardware.

An examination of the various operations that occur within a computer indicates that some tasks will take longer to perform than others. Typically, data manipulation functions such as addition and subtraction require very little central processing unit (CPU) time. On the other hand, the time necessary to read data and instructions held in memory is much greater and is perhaps the most time-consuming activity encountered in the course of a computer's operation. During such memory operations, the CPU is forced to remain idle, lowering the overall efficiency of the computer. For that reason, methods for reducing memory access time using either hardware, or software, or a combination of the two, are continually being developed.

One method currently used is that of instruction look ahead. Look ahead techniques are conceptually very simple and perhaps not original with computer technology. Normally, instructions are stored sequentially in blocks in a memory. The method assumes that there is a high probability that the next instruction can be found at the next sequential location in memory. While one instruction is being fetched from the memory, the memory addressing circuitry selects the instruction located in the next sequential location, while the first instruction is utilized. At the conclusion of that operation, the CPU will select the second instruction immediately unless instructed to jump to a different location for a new block of instructions. Assuming that that second instruction is properly the next necessary step, it can be utilized without requiring a repositioning of the memory. At that time the look ahead circuitry accesses the third sequential location on the assumption that the instruction located therein will be requested at the conclusion of the current execution.

If there are few jumps required for access of instructions, the technique of look ahead can be quite advantageous. As the number of jumps increases, the benefit realized from look ahead diminishes proportionately. Assuming that instructions are stored sequentially in significantly large blocks in the memory, thus requiring few jumps, look ahead is a viable method for increasing the throughput of a computer system. Still, with the improved hardware, look ahead techniques as currently employed are unable to keep pace with the lightning-fast operations of the CPU. Thus, memory access time must be decreased even further.

A shortcoming of present look ahead techniques is the cost in terms of hardware and software. Contemporary systems require vast amounts of dedicated hardware and software in the CPU to achieve a look ahead capability. The actual configuration must be tailored to the individual requirements of each CPU, requiring a separate design in each instance. A universal, standalone module, external to the CPU would provide obvious savings.

SUMMARY OF THE INVENTION

Memory access time can be significantly improved by applying the technique of look ahead to a partitioned memory. By dividing the memory into at least three physically distinct zones, allocating two of the zones for the odd and even instruction addresses and the third zone for the operand addresses, look ahead can be utilized in a manner that realizes a much greater savings than if it were used with a single mass memory. Consider, for the moment, a series of instruction addresses. At any given time, the system uses the present address to generate a predicted address for the next instruction. If the present address is an odd address, this address is incremented by one to create the next predicted address, which is even. The next actual address is supplied on the address bus from the CPU and at that time is compared against the predicted address. By the time the actual address is supplied from the CPU, the even memory has already stabilized at the predicted location and if the addresses are identical, memory access can occur immediately. When the actual even address is present on the address bus, the access circuitry for the odd memory undergoes the same process of incrementing and prediction as did the even memory circuitry. Until a jump is required, the two look ahead circuits operate in a reciprocal fashion, passing off the addressing function from one to the other. Should a jump actually occur, the CPU pauses just long enough to permit the proper memory to reposition itself and stabilize. Thereafter, it resumes its high speed operation.

In present monolithic memory configurations, operands are usually stored in memory space physically separate from the instructions, and this same arrangement is employed in the invention as well. When the CPU is seeking an operand address, it outputs a discrete signal which serves to disable the instruction look ahead circuitry, so as to prevent updating the instruction memories with a discontinuous address intended for the operand memory. If the operand memory is partitioned in the same manner as the instruction memory, and has similar look ahead circuitry, the operand address would be processed in the same fashion as described previously for the instruction addresses. The first operand address would yield a predicted second operand address to be compared against the next operand address, assuming a series of at least two operand addresses. Here again, the look ahead circuitry will determine whether the CPU can obtain the operands during short memory access cycles for sequential operand addresses or alternatively long cycles where jumps in the address location are required. The gains realized from look ahead capability can be increased by storing exceptionally long strings of operands in sequential locations in memory. If the operand memory is not partitioned into separate odd and even sections, then all operand fetches will require a long cycle interval to account for any necessary jumps.

This method of partitioning a memory can be used to great advantage by applying it to memories employing virtual addressing. If an arbitrary address length of sixteen bits is selected, the memory is obviously limited to a size of approximately sixty-four thousand words as a result of such selection. It is known, however, that virtual addressing techniques permit one to use significantly larger memories notwithstanding an address word length of limited size. In the invention, the address is split into a virtual portion and a local (real) portion. The local portion comprises the less significant bits which are supplied directly to the memory. The virtual portion, comprising the more significant bits, is supplied to a random access memory (RAM) containing a programmed lookup table. This virtual portion addresses the RAM, which in turn yields a real address portion having more bits than the virtual portion. The "expanded" real address portion then compliments the local address portion, which together are supplied to the memory. In the arbitrary example given, if the "expanded" real address portion consists of eight bits, the resulting address has a total of twenty bits and is thus capable of addressing a memory much larger than originally possible with the sixteen bit address supplied by the CPU (approximately one million words). As with the prior configuration of the partitioned memory, the identical look ahead circuitry performs a similar comparison, generating predicted addresses and providing a fast memory access where jumps are not required. Likewise, should a jump occur, in either the virtual or local portions of the address, the CPU is instructed to pause momentarily until the data stabilizes. No additional circuitry is necessary for virtual addressing with look ahead capability.

One of the more significant features of the invention is its flexibility. By design, it is intended that the look ahead circuitry will be external to the CPU. With a minimum of interfacing, the invention can be adapted for use with any CPU and memory, such as found in microprocessor systems, minicomputers and large main frame computers. Ideally, the circuitry would be packaged using one of the currently available LSI (large scale integration) techniques.

For a better understanding of the present invention together with other and further objects, reference is made to the following description taken in conjunction with accompanying drawings.

DESCRIPTION OF THE PREFERRED EMBODIMENT

Figure 1:
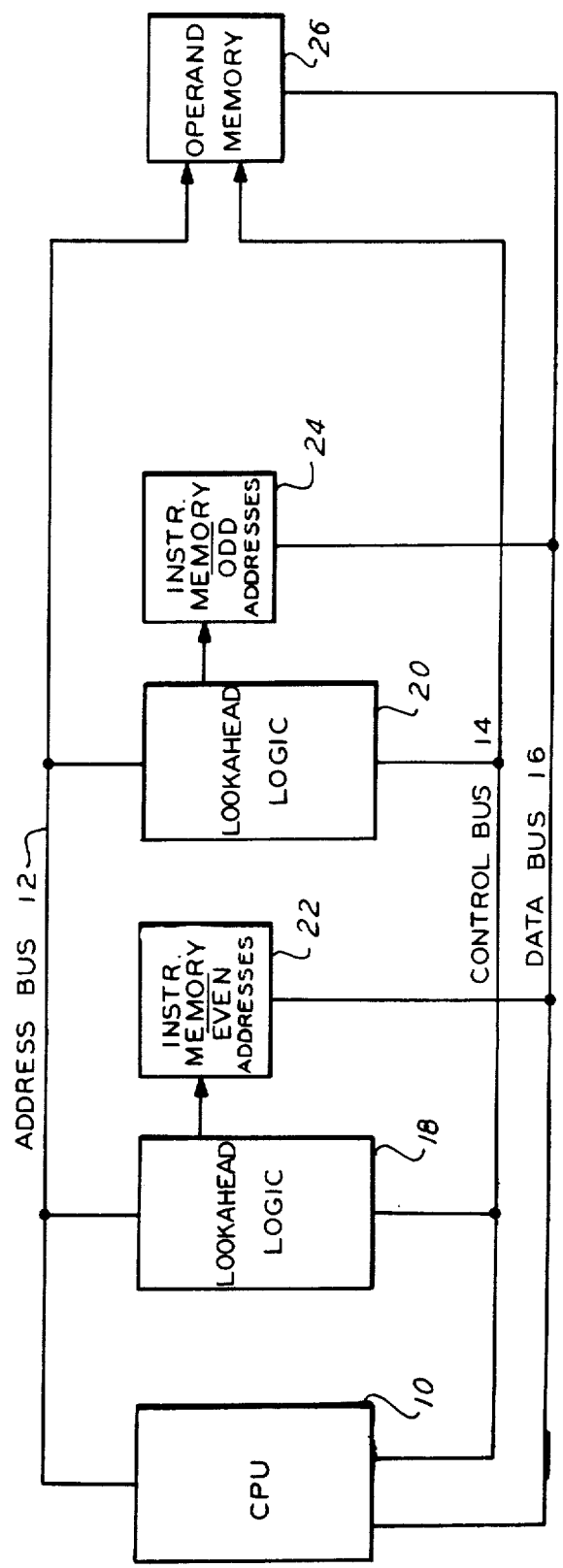
FIG. 1 is a block diagram of a computer employing the partitioned memory look ahead system.

FIG. 1 shows a block diagram of a computer employing look ahead techniques for a partitioned instruction memory. The central processing unit (CPU) 10 controls and directs the operation of the system via its three buses, namely, an address bus 12, a control bus 14, and a data bus 16. For simplicity, input/output (I/O) devices are not shown. In this particular configuration, partitioning and look ahead is provided for the instruction memory alone. If desired, the same could be provided for the operand memory as well. As illustrated, the CPU 10 provides addresses on address bus 12 to the instruction memory through the look ahead logic modules 18 and 20. These look ahead logic modules 18 and 20 in turn process and direct this information for transmission to the partitioned even and odd instruction memory modules 22 and 24. The operand memory 26 simply takes its address information directly from the address bus 12.

The look ahead logic modules 18 and 20 are controlled by the CPU 10 through commands delivered on the control bus 14. The control bus 14 also supplies commands for the operand memory to control its input and output. Finally, data is passed between the various memory modules and the CPU 10 along the data bus 16.

Look Ahead Logic Circuitry

Figure 2:
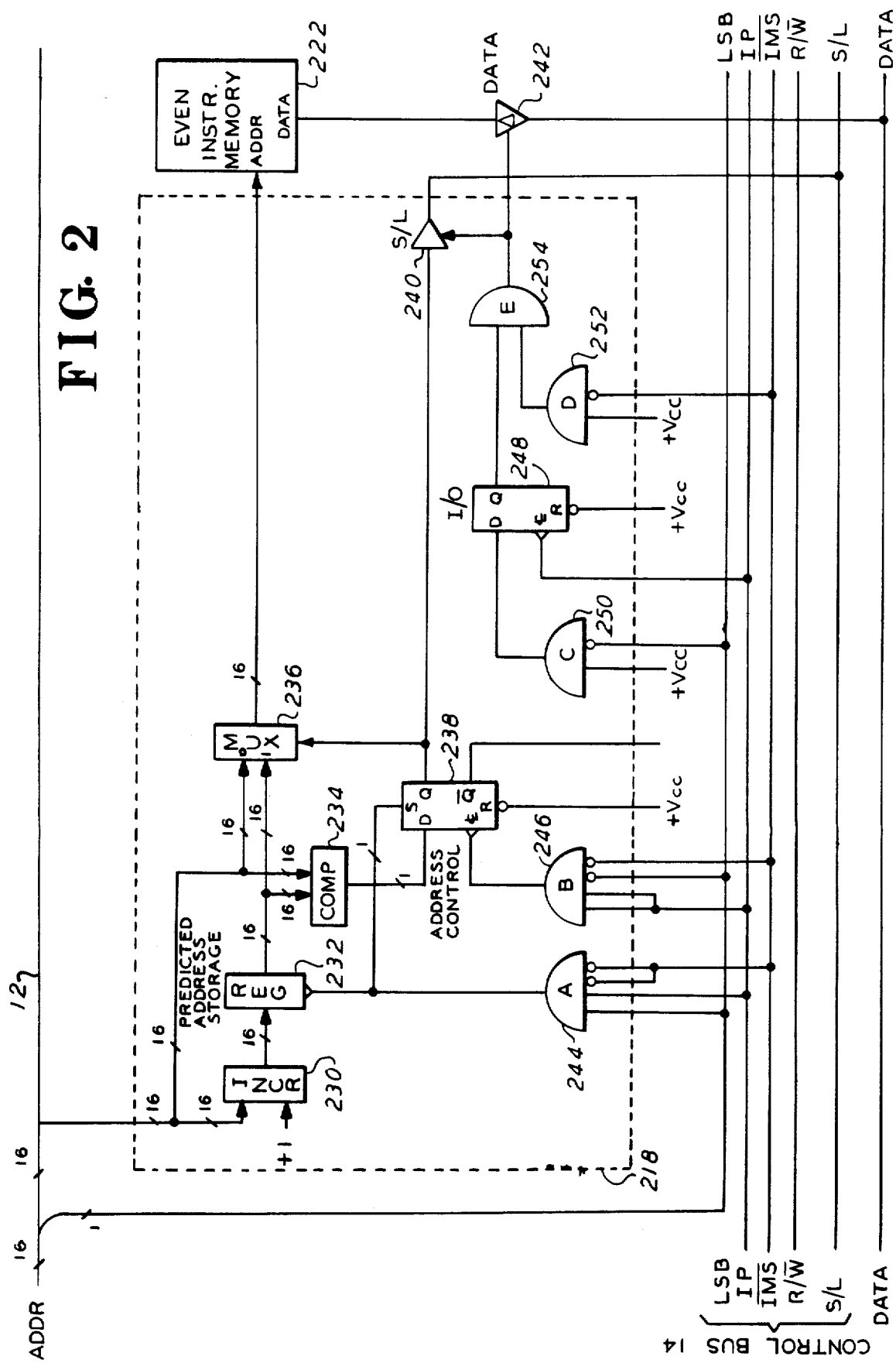
Figure 2 is a schematic diagram of the look ahead circuitry for the even instruction memory.
Figure 3:
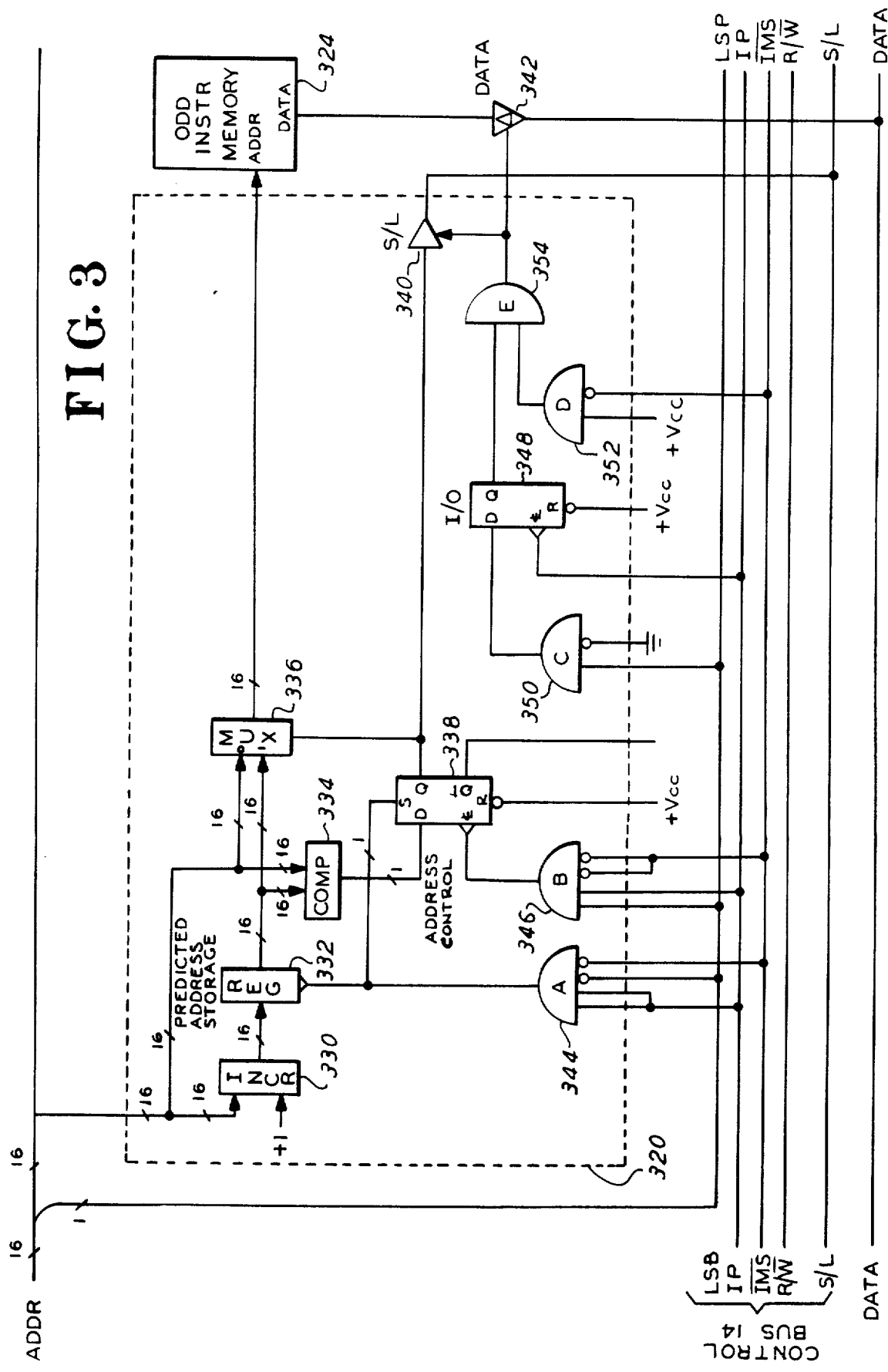
FIG. 3 is a schematic diagram of the look ahead circuitry applied for the odd instruction memory.
Figure 4:
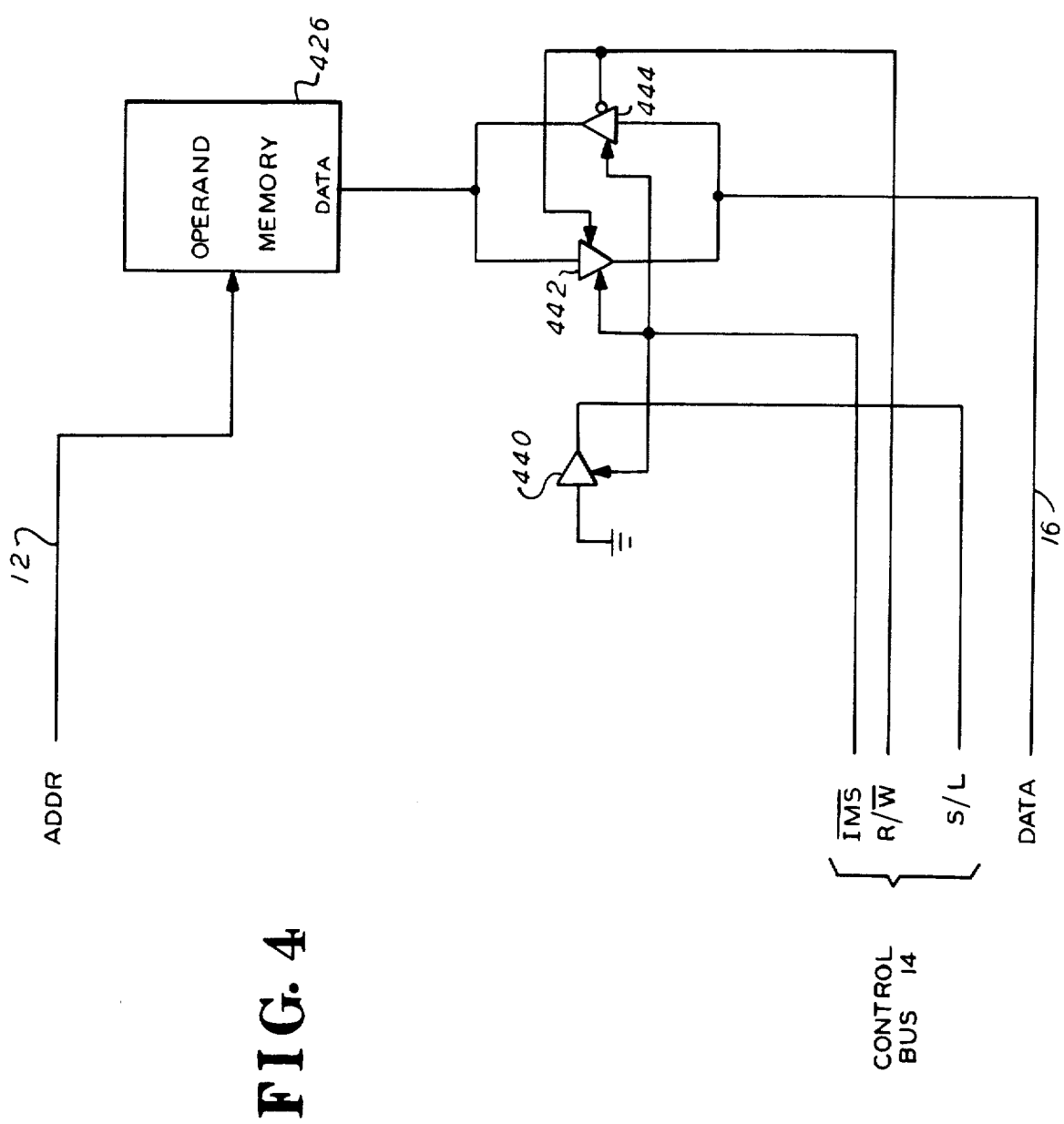
FIG. 4 is a schematic diagram of the gating circuitry for the operand memory.

FIGS. 2, 3, and 4 present a detailed illustration of the modules in the block diagram of FIG. 1, less the CPU 10. A careful comparison of FIGS. 2 and 3 will show that the look ahead logic modules are indeed identical. The differences occur only in the interconnection between the control lines, which together comprise the control bus 14, and the logic modules 18 and 20. (To further indicate similarity, the last two digits of the reference numerals for any particular component of the look ahead logic modules FIGS. 2, 3, 7, and 8 are the same e.g., MUX 236, 336, 736 and 836.)

The primary input to the look ahead logic module 218 in FIG. 2 is taken from the address bus 12. This address bus input is connected to an incrementing circuit 230, which in turn provides an incremented address to the address storage register 232. The address information is also provided to one input of an address comparator 234 and one input of a multiplexer 236. The output of the address storage register 232 is connected to the other input of the address comparator 234 and the other remaining input of the multiplexer 236.

A data input for the address control flip-flop 238 is supplied by the output of the comparator 234. The output of the flip-flop 238, which indicates whether there is a match between the predicted and the actual addresses, is in turn connected to the control input of the multiplexer 236 and also to the CPU 10 along the short/long cycle (S/L) line through the S/L transmission gate 240. Finally, the even instruction memory module 222 address input is taken from the output of the multiplexer and the output of the memory module 222 is connected to the data bus 16 through a data transmission gate 242.

Control functions for the look ahead logic circuit are received through various AND gates and a flip-flop. The address storage register 232 is clocked and loaded upon a command received from the output of AND gate A 244, which sets the address control flip-flop 238. The output of AND gate A 244 is controlled by an input from the least significant bit (LSB) line of the address bus 12, an input from the initialization pulse (IP) line, and an inverted input from the instruction memory (IMS) line. The purpose and functions of these control lines will be discussed further on.

A second gate, AND gate B 246, controls the clock input to the address control flip-flop 238. The output of AND gate B 246 is controlled by an input from the IP line, an inverted input from the LSB line of the address bus 12, and an inverted input from the IMS line.

Transmission of data from the memory to the data bus 16 through the data transmission gate 242 is essentially controlled by the input/output (I/O) flip-flop 248. The data input to the I/O flip-flop 248 is provided by the output of AND gate C 250, configured as an inverter, which is controlled by a single inverted input from the LSB line of the address bus 12. The clock input of the I/O flip-flop 248 is derived from the IP line.

A fourth gate, AND gate D 252, also configured as an inverter, receives its input from the IMS line. The output controls one input of a fifth AND gate, AND gate E 254. The other input to AND gate E 254 is provided from the output of the I/O flip-flop 248. When the level on the IMS line is low, the output of the I/O flip-flop 248 will be carried through AND gate E 254 to control the two transmission gates 240 and 242. This completes the structure of the circuitry in FIG. 2.

The identical look ahead logic module 218, that appears in FIG. 2, can also be found in FIG. 3. As stated previously, the only difference is that the look ahead logic module 320 has different connections to the lines of the control bus 14. Thus, only those connections need be discussed at this point. AND gate A 344 receives inputs from the IP line, an inverted input from the least significant bit (LSB) line of the address bus 12, and an inverted input from the IMS line. AND gate B 346 is controlled by an input from the LSB line of the address bus 12, an input from the IP line, and an inverted input from the IMS line. A single input from the LSB line of the address bus 12 controls AND gate C 350, which is configured to operate as a buffer, in contrast with AND gate C 250 in FIG. 2. The input to AND gate D 352 is the same as in FIG. 2, i.e., an inverted input from the IMS line, and the clock input of the I/O flip-flop 348 is similarly taken from the IP line.

In the configuration illustrated in FIG. 1, the operand memory is not partitioned and does not have look ahead logic circuitry. As shown in FIG. 4, the operand memory 426 receives its address directly from the address bus 12. Output from the operand memory 426 is controlled by an output transmission gate 442 and its input by an input transmission gate 444. Both transmission gates 442 and 444 are in turn enabled by inputs from both the IMS line and the read/write (R/W) line, except in the case of the input transmission gate 444, where the R/W line input is inverted. The last remaining component in FIG. 4 is a third transmission gate 440 arranged to generate a signal indicating a long cycle, for transmission to the CPU 10 on the S/L line whenever enabled by the IMS line.

Overview of the Look Ahead Circuitry Operation

Figure 5:
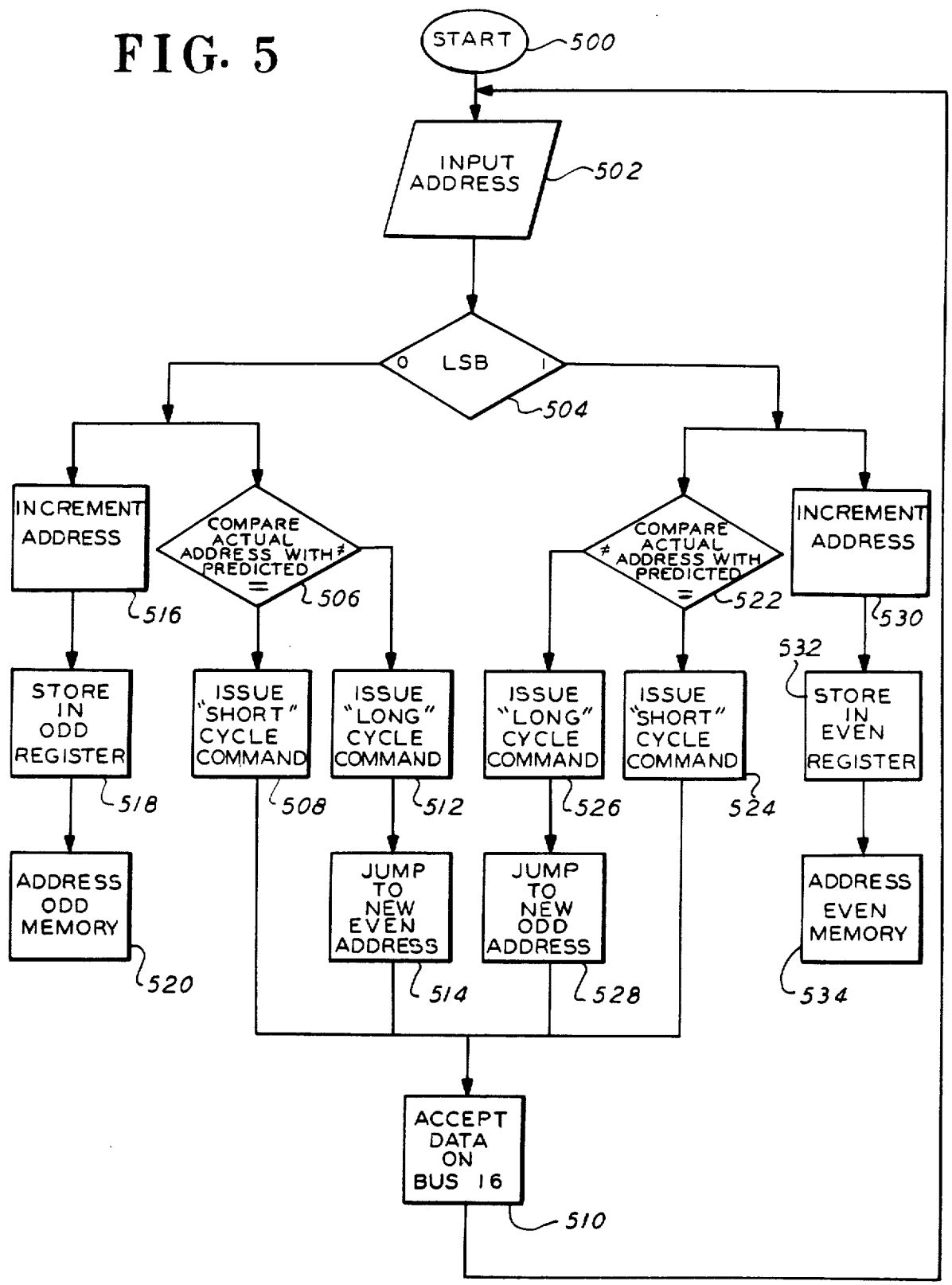
FIG. 5 is a flow chart depicting the operation of a computer employing look ahead circuitry with a partitioned memory.

The operation of the system will now be explained with reference to the flow chart in FIG. 5. (Reference numerals refer to the various blocks in the flow chart.) At the start (500), the CPU 10 initiates a hypothetical process that requires certain memory access operations. Initially, the CPU 10 places an address on the address bus 12 in order to fetch the required information (502). In this example, it is assumed that the CPU 10 is seeking an instruction and not an operand and therefore, the explanation will deal only with the instruction memory.

The least significant bit of the address on address bus 12 is examined to determine whether the address is even or odd, a "one" indicating an odd address and a "zero" indicating an even address (504). Assuming for the moment that the address is even, the even instruction memory 22 (FIG. 1) is accessed while the look ahead logic circuitry for the odd memory simultaneously processes this current address. In the even section, the actual address, i.e., the one presently appearing on address bus 12, is compared with the predicted address stored in the even address storage register 232 (FIG. 2) by the even address comparator 234 (506). The predicted address was generated on the previous memory access cycle in a manner that will be explained in further detail below. If the actual address is the same as the predicted address, the look ahead logic module 218 will issue a short cycle command (508) and the CPU 10 can immediately read the even memory (510). Should the actual address differ from the predicted address, a long cycle command is then issued (512) and the memory is instructed to jump to a new address (514). After a predetermined settling-out time, the CPU 10 can accept the data on the data bus 16 (510).

Concurrently with the comparison and accessing taking place in the even section, the odd look ahead logic module was generating a predicted next odd address. The even address was incremented (516) and then stored in the odd address storage register 332 (518). Once the predicted address has been entered into the register 332, the odd memory 324 is addressed (520), and can be accessed immediately if the next address is identical.

After the CPU 10 has accepted the instruction on the data bus 16 (510), it can place the next address on the address bus 12 to initiate another fetch (502). Again, the least significant bit of the new address is examined to determine whether it is even or odd (504). Assuming that it is the next sequential address after the previous even address, it is then in fact an odd address.

The new address placed on address bus 12 is compared with the predicted address stored in the odd address storage register 332, which was generated during the previous even memory access cycle (516, 518). This comparison occurs in the odd address comparator 332 (522). In this example, it has been assumed it is a sequential address and thus a short cycle command is issued (524) and the odd memory can be read at once and accepted by the CPU 10 (510). Had there been a different address placed on the address bus 12, the look ahead logic module 320 would then have issued a long cycle command (526) and the memory would jump to a new address (528). After the requisite propagation delay time, the CPU 10 could then accept the data on the data bus 16 (510).

As during the even memory access cycle, a next predicted address is generated during the odd memory access cycle. The odd address, appearing on the address bus 12, is incremented by the look ahead logic module 218 in the incrementing circuit 230 (530). This incremented address is stored in the even address register 232 (532) and the even instruction memory address input is primed with this predicted address (534). At the conclusion of the odd memory access cycle, the CPU 10 can request a further instruction, initiating the process once again.

Detailed Discussion of the Look Ahead Circuitry Operation

The operation of the circuitry illustrated in FIGS. 2 and 3 will now be explained in much greater detail with reference to the timing diagram in FIG. 6. (The 600 series reference numerals in parentheses refer to the individual waveforms.) To clarify matters, an explanation of the functions of the various lines of the control bus 14 will be given first. The LSB line, the least significant bit line of the address bus 12, indicates whether the address is odd or even. A signal indicating whether an instruction or operand is desired is supplied by the $\overline{\text{IMS}}$ line. The IP line, coming from the CPU 10, delivers an initiate pulse which triggers all operations that occur externally to the CPU 10. It is assumed that the address bus 12 and the $\overline{\text{IMS}}$ line are stable at their new states when the initiate pulse arrives. Input and output from the operand memory is controlled by the read/write (R/$\overline{\text{W}}$) line. Finally, the look ahead logic modules transmit short and long cycle indicators back to the CPU 10 on the S/L line.

Figure 6:
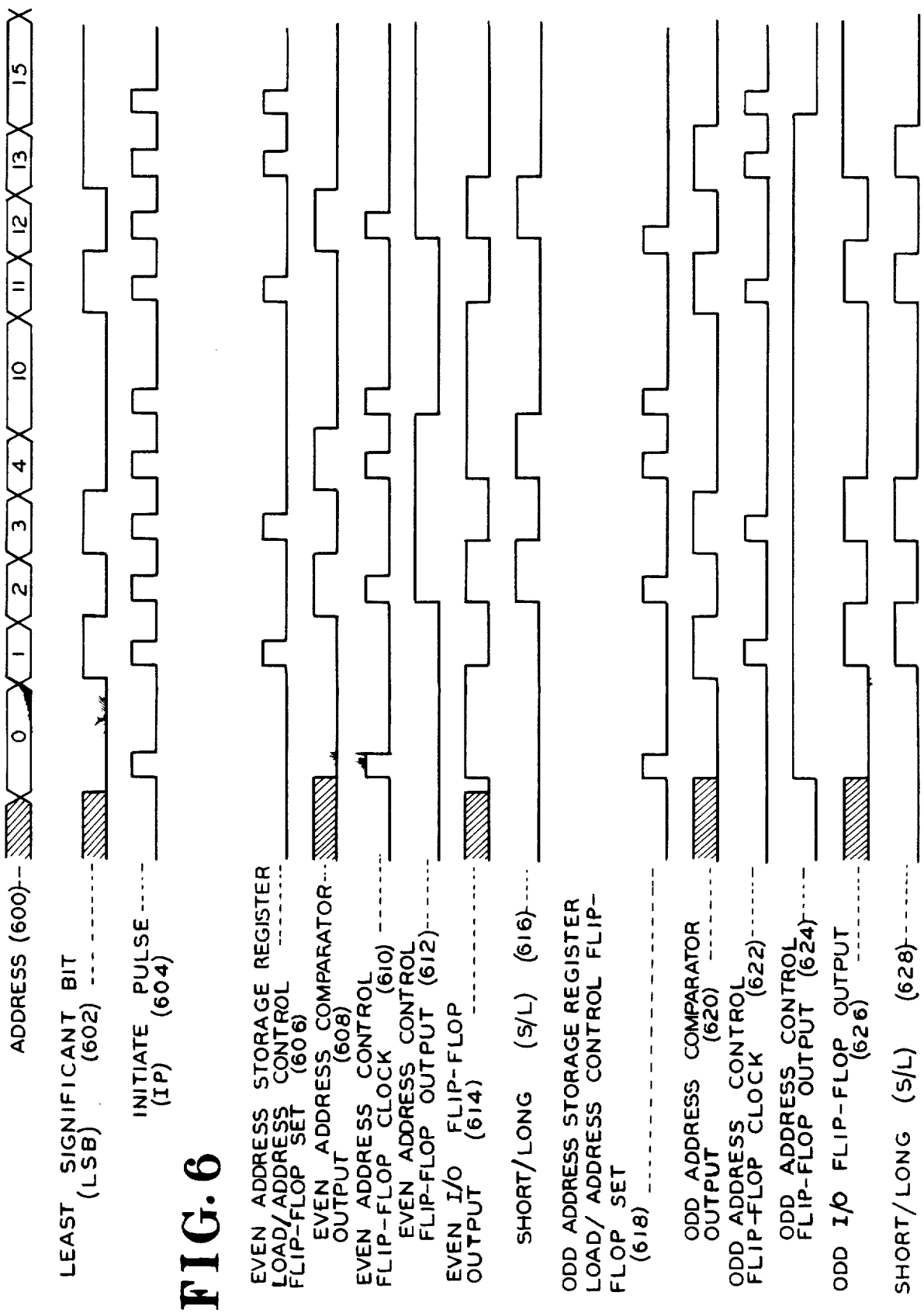
FIG. 6 is a timing diagram for the circuitry illustrated in FIGS. 2, 3, and 4.

In the example given in FIG. 6, a series of addresses for the instruction memory are presented (600). Since these are purely instruction memory addresses, the level on the $\overline{\text{IMS}}$ line is at logical zero throughout, and thus not illustrated. As a consequence of this, AND gate A 244 and AND gate B 246 in FIG. 2, and AND gate A 344 and AND gate B 346 in FIG. 3, are partially enabled. AND gate D 252 and AND gate D 352 in FIGS. 2 and 3, respectively, show a logical one at their outputs and will cause the output of AND gate E 254 in FIG. 2 and AND gate E 354 in FIG. 3 to reflect the inputs from the respective I/O flip-flops 248 and 348.

In a normal sequence, the CPU 10 places the first address 0 on the address bus 12. Being that this is an even address, the LSB line is at logical zero (602). The address reaches the even address comparator 234 which compares it with the predicted address stored in the even address storage register 232. In this example, it is assumed that the addresses do not agree and the comparator 234 issues a logical zero output.

A short while after the address is placed on the bus, the CPU 10 delivers an initiate pulse on the IP line (604). Under the conditions thus far stated, with the LSB line low and the IP line high, AND gate A 244 is not enabled and AND gate B 246 is enabled. The output from AND gate B 246 clocks the address control flip-flop 238, which passes the logical zero output from the address comparator 234 to its Q output (612). This logical zero output switches the multiplexer 236 to accept the "0" input, which is connected to the address bus 12 and the actual address present thereon is supplied to the even instruction memory module 222. At the same time, AND gate C 250 presents a logical one to the even I/O flip-flop 248. The level on LSB line is inverted and causes the output of AND gate C 250 to go high. The initiate pulse on the IP line clocks the I/O flip-flop 248 which in turn passes the high level signal through to AND gate E 254. Since AND gate D 252 is already at logical one, the output of the even I/O flip-flop 248 is passed through AND gate E 254 to enable the odd S/L transmission gate 240 and the even data transmission gate 242 (614, 616).

Although the data transmission gate 242 is enabled, the output of the even address control flip-flop 238 is low and this is passed back to the CPU 10 through the S/L transmission gate 240 on the S/L line, indicating a long memory access cycle.

While the even instruction memory is being accessed, the odd look ahead logic module 320 is generating the next predicted address. The address on the address bus 12 passes through the incrementing circuit 330 and is incremented by a logical one. Note that the level on LSB line is low and, when the initiate pulse is present, the level on the IP line is high. The output of AND gate C 350 is therefore low and is clocked through the I/O flip-flop 348 when it is clocked by the initiate pulse on the IP line. Even though the output of AND gate D 352 is high, the output of AND gate E 354 remains at logical zero and neither the S/L transmission gate 340 or the data transmission gate 342 are enabled, being that this is an even memory access cycle.

The inverted logical zero level on the LSB line and the logical one level on the IP line enable AND gate A 344 thus loading the odd address storage register 332 with the output from the incrementing circuit 330. At the same time, the output from AND gate A 344 sets the odd address control flip-flop 338 to an output of logical one switching the multiplexer 336 to accept input "1" which is the output of the odd address storage register 332. By the time the next address is placed on the address bus 12, the odd instruction memory 324 will be positioned at the address stored in this register 332.

Assume, as shown in the example in FIG. 6, that the next address placed on the address bus 12 is address 1. The level on the LSB line is thus high (602) and therefore the outputs of AND gate B 246 and AND gate C 250 are forced low. When the initiate pulse arrives, the even I/O flip-flop 248 is clocked passing a logical zero to AND gate E 254, which in turn disables the even S/L transmission gate 240 and the even data transmission gate 242. Referring to FIG. 3, the odd address storage register 332 already contains a predicted address, which is compared against the actual address 1 by the odd address comparator 334, which issues a logical one output. AND gate A 344, receiving an input from the IP line, which goes high when the initiate pulse is present, is disabled by the inverted high level on the LSB line. AND gate B 346 on the other hand, shows a logical one output because the LSB line input and the IP line input are not inverted and this output clocks the odd address control flip-flop 338 when the initiate pulse arrives (622). As the output of the odd address comparator 334 is high, the output of the address control flip-flop 338 does not change and the multiplexer 336 likewise does not switch. The output of AND gate C 350 is at logical one and is clocked through the odd I/O flip-flop 348 by the initiate pulse on the IP line (626). AND gate E 354 passes this logical one level through because AND gate D 352 has a logical one output as well, enabling the odd S/L transmission gate 340 and the odd data transmission gate 342. The output of the odd address control flip-flop 338 is passed through the odd S/L transmission gate 340 on the S/L line to the CPU 10 to indicate that the predicted address matches the actual address and the CPU can therefore execute a short memory access cycle (628).

During the access of instruction address 1, the even look ahead logic module 218 is generating the next predicted address, which is instruction address 2. Address 1 is incremented in the even incrementing circuit 230. The even address storage register 232 accepts the output of the even incrementing circuit 230 when the output of AND gate A 244 goes to a logical one, which occurs when the initiate pulse is present on the IP line. At the same time, the even address control flip-flop 238 output is set to logical one by the set input, forcing the multiplexer 326 to accept its level 1 input. The even instruction memory module 222 now sees the predicted address stored in the even address storage register 232. As with the predicted address 1, addressing transients in the even instruction memory module will have settled out when the new address is placed on the address bus 12.

The circuitry in FIGS. 2 and 3 function similarly for address locations 3 and 4. The operation is altered when address 10 is placed on the address bus 12, indicating a jump to a nonsequential location. Being that address location 10 is an even address, the various AND gate outputs remain undisturbed. The output of the even address comparator 234, however, goes to a logical zero switching the multiplexer 236 to its "0" input, or the address bus 12. The output of the even address comparator 234 is clocked through the even address control flip-flop 238, through the even S/L transmission gate 240 and onto the S/L line to the CPU 10, indicating a long memory access cycle. The next address, being address location 11, is a sequential address and short memory access cycle operation resumes until address location 15 is requested. Again, a jump occurs as did with address location 10.

Virtual Memory

Figure 7:
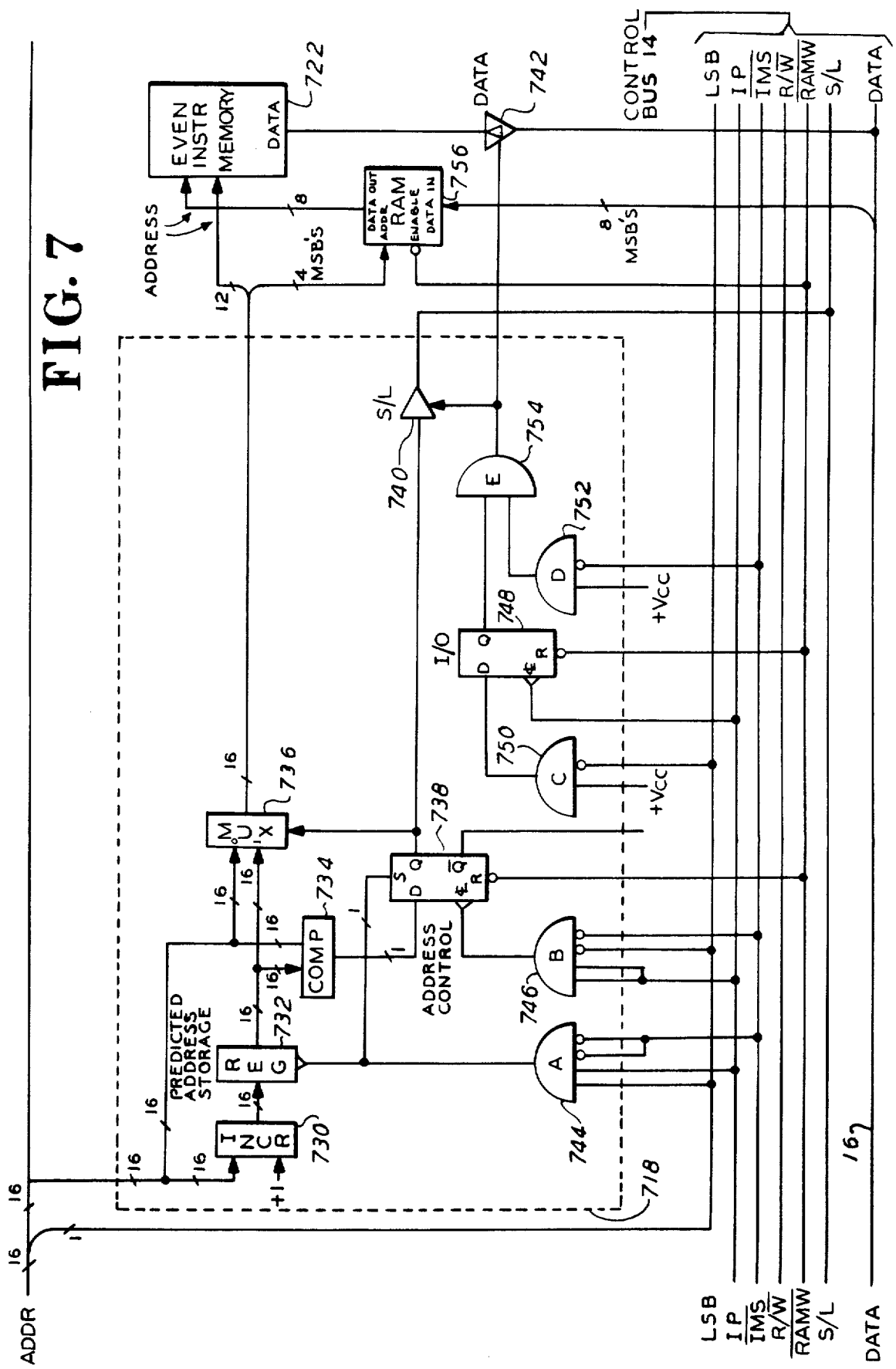
FIG. 7 is a schematic diagram of the look ahead circuitry for the even section of a partitioned memory using virtual addressing.
Figure 8:
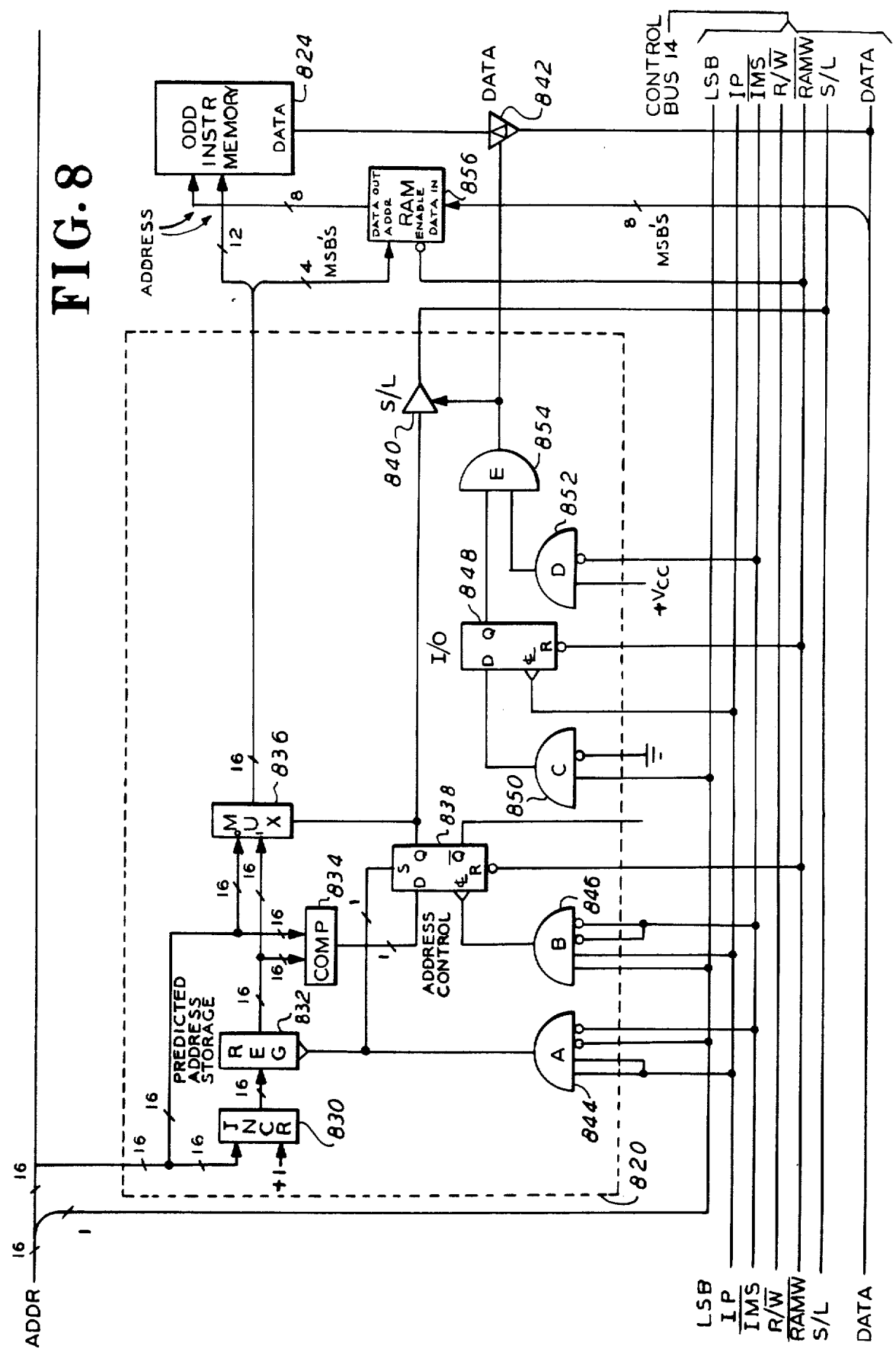
FIG. 8 is a schematic diagram of the look ahead circuitry for the odd section of a partitioned memory using virtual addressing.

FIGS. 7 and 8 illustrate the look ahead logic circuitry adapted to a memory using virtual addressing techniques. The most significant difference between the virtual and the nonvirtual systems is the addition of a random access memory (RAM) for each memory module. This added memory serves as a lookup table to translate virtual address portions into real address components. The only other major change is the connection of the reset inputs of the address control flip-flops 738 and 838 and the reset inputs of the I/O flip-flops 748 and 848 to the RAM write ($\overline{RAMW}$) line. In the system shown in FIGS. 7 and 8, the virtual addressing scheme permits a memory having a twenty bit address to be addressed by an address word length of only sixteen bits. The twelve least significant bits comprise the real address portion and the four most significant bits represent the virtual portion. The RAMs 756 and 856 are programmed with actual address portions corresponding to the virtual address portions that appear on the address bus 12. For any given four bit combination, the RAM will output a unique eight bit word. It is the responsibility and function of the CPU 10 to program the RAMs 756 and 856 to assure that the proper addresses are stored in the lookup table. During reprogramming operations, the $\overline{RAMW}$ line is low, resetting all flip-flops. The multiplexers 736 and 836 are switched to their level zero inputs connecting the RAM address inputs to the four most significant bit lines of the address bus 12. The CPU 10 then can load the RAMs 756 and 856 directly from the data bus 16. When this operation has been completed, the $\overline{RAMW}$ line goes high and the circuitry returns to its normal operational mode. The $\overline{RAMW}$ line also enables the write control input of the RAM.

The operation of the look ahead logic circuitry when used with virtual addressing is for all purposes identical to that of the circuitry in FIGS. 2 and 3. The same comparison occurs in the address comparators 734 and 834 except that what is being compared are real and virtual portions of a composite address. Should either portion differ from the corresponding portions of the predicted address, then the system is commanded to execute a long memory access cycle for a jump. It is possible that a slightly longer long memory access cycle would be required in order to account for two sequential memory transient periods, for the RAM and the memory module, respectively. Otherwise, the operation depicted in the flow chart in FIG. 5 and the timing diagram in FIG. 6 is similar.

An important advantage of this invention is the fact that the look ahead logic modules never change internally. The same circuitry may be used regardless of whether it is to function with an operand or instruction memory module or whether it is handling actual or virtual addresses. The uniformity of the circuit and its potential widespread applications lends itself readily to fabrication in microcircuit form. Conceivably, a pair of these units and two bidirectional transmission gates could be incorporated in a single integrated circuit.

While there has been described what is believed to be the preferred embodiment of the invention, those skilled in the art will recognize that other and further modifications may be made thereto without departing from the spirit of the invention, and it is intended to claim all such embodiments as fall within the true scope of the invention.

I claim:

1. A data processing system for processing a plurality of operands according to a plurality of instructions comprising:

a data bus;

an address bus;

a central processing unit, having a data port connected to said data bus, an address port connected to said address bus, and control outputs, where said central processing unit supplies a series of addresses through said address bus, any given one of said series being the present address and the following sequential one being the next address;

at least two addressable instruction memory modules, each having a plurality of addressable locations designated by a plurality of address, an address input, and a data port means for receiving and transmitting said intructions, said data port means being connected to said data bus;

at least two address look ahead means for generating a predicted address from said present address, each having an address input connected to said address bus, an address output connected to said address input of an individual one of said addressable memory modules, and control inputs connected to said control outputs of said central processing unit; and an addressable operand memory module for storing said operands, having a plurality of addressable locations designated by a plurality of addresses, an address input, and a data port means for receiving and transmitting said operands, said data port means being connected to said data bus and said data port means having control inputs connected to said control outputs of said central processing unit, and said address input being connected to said address bus, wherein said instructions are numbered and wherein one of said addressable instruction memory modules contains odd-numbered instructions and another of said addressable instruction memory modules contains even-numbered instructions; and wherein said address look ahead means further comprises:

incrementing means for incrementing a present address to create a predicted address;

storage means for storing said predicted address;

address comparison means for comparing said next address with said predicted address, said comparison means having a binary output means, outputting a logical 1 when said predicted and next addresses are identical and a logical 0 when said predicted and next addresses are not identical;

switch means for selecting said predicted address when said output of said comparison means is logical 1 and selecting said next address when output of said comparison means is logical 0;

flip-flop means having a control input connected to said binary output means of said address comparison means and an output connected to said switch means and said data port means of the respective one of said addressable instruction memory modules; and activator means connected to said control outputs of said central processing unit for activating said address look ahead means; and wherein a portion of said address is designated as the virtual address and wherein said address look ahead means further comprises lookup memory means for generating a real address portion from said virtual address portion, said lookup memory means having an address input connected to said switch means, a data input connected to said data bus, and a data output connected to said address output of said address look ahead means.

* * * * *